United States Patent
Bruyere et al.

(10) Patent No.: US 8,339,306 B2
(45) Date of Patent: Dec. 25, 2012

(54) DETECTION SYSTEM AND METHOD USING GRADIENT MAGNITUDE SECOND MOMENT SPATIAL VARIANCE DETECTION

(75) Inventors: Donald P. Bruyere, Tucson, AZ (US); Ivan S. Ashcraft, Marana, AZ (US); John B. Treece, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 13/288,009

(22) Filed: Nov. 2, 2011

(65) Prior Publication Data
US 2012/0105275 A1 May 3, 2012

Related U.S. Application Data

(63) Continuation of application No. 11/975,393, filed on Oct. 18, 2007, now Pat. No. 8,054,217.

(60) Provisional application No. 60/854,861, filed on Oct. 26, 2006.

(51) Int. Cl.
G01S 13/89 (2006.01)
G01S 13/90 (2006.01)
G01S 13/00 (2006.01)

(52) U.S. Cl. ............ 342/179; 342/25 R; 342/25 A; 342/89; 342/91; 342/93; 342/175; 342/176; 342/195

(58) Field of Classification Search .......... 702/127, 702/189–199; 382/100, 107, 154, 162, 165, 382/181, 190, 195, 201, 232, 236; 342/21, 342/22, 25 R–25 F, 26 R–26 D, 70–72, 89–103, 342/159–164, 175, 176, 179, 192–197
See application file for complete search history.

(56) References Cited

U.S. PATENT DOCUMENTS

| | | | |
|---|---|---|---|
| 3,646,555 A | 2/1972 | Atlas | |
| 3,761,922 A | 9/1973 | Evans | |
| 3,806,929 A | 4/1974 | Moore | |
| 4,031,364 A | 6/1977 | Wilmot | |
| 4,074,264 A | 2/1978 | Wilmont | |
| 4,318,100 A | 3/1982 | Shimizu et al. | |
| 4,489,319 A | 12/1984 | Hansen | |
| 4,513,286 A | 4/1985 | Irabu | |

(Continued)

FOREIGN PATENT DOCUMENTS
WO WO-0114907 3/2001
(Continued)

OTHER PUBLICATIONS

"U.S. Appl. No. 11/975,393, Advisory Action mailed Jul. 8, 2011", 3 pgs.

(Continued)

*Primary Examiner* — Bernarr Gregory
(74) *Attorney, Agent, or Firm* — Schwegman Lundberg & Woessner, P.A.; Gregory J. Gorrie (57) ABSTRACT

A detection system includes a detection processor configured to receive a frame of image data that includes a range/Doppler matrix, perform a rate-of-change of variance calculation with respect to at least one pixel in the frame of image data, and compare the calculated rate-of-change of variance with a predetermined threshold to provide output data. The range/Doppler matrix may include N down-range samples and M cross-range samples. The detection processor may calculate a rate-of-change of variance over an N×M window within the range/Doppler matrix.

12 Claims, 5 Drawing Sheets

U.S. PATENT DOCUMENTS

| | | | |
|---|---|---|---|
| 4,600,925 | A | 7/1986 | Alitz et al. |
| 4,628,318 | A | 12/1986 | Alitz |
| 4,665,402 | A | 5/1987 | Young |
| 4,970,660 | A | 11/1990 | Marchant |
| 5,018,218 | A | 5/1991 | Peregrim et al. |
| 5,243,663 | A | 9/1993 | Kudoh |
| 5,390,133 | A | 2/1995 | Sohie |
| 5,402,131 | A | 3/1995 | Pierce |
| 5,430,445 | A | 7/1995 | Peregrim et al. |
| 5,448,502 | A | 9/1995 | Kindo et al. |
| 5,694,342 | A | 12/1997 | Stein |
| 5,694,487 | A | 12/1997 | Lee |
| 5,900,835 | A | 5/1999 | Stein |
| 6,038,526 | A | 3/2000 | Stein |
| 6,040,797 | A | 3/2000 | Hofele |
| 6,094,160 | A | 7/2000 | Lajiness |
| 6,137,439 | A | 10/2000 | Bradford et al. |
| 6,229,475 | B1 | 5/2001 | Woolley |
| 6,369,749 | B1 | 4/2002 | Frey, Jr. |
| 6,377,206 | B1 | 4/2002 | Petty |
| 6,389,084 | B1 | 5/2002 | Rupp |
| 6,553,007 | B1 | 4/2003 | Pekkarinen |
| 6,894,639 | B1 | 5/2005 | Katz |
| 6,911,933 | B1 | 6/2005 | Mutz et al. |
| 6,924,763 | B2 | 8/2005 | Poullin |
| 6,975,755 | B1 * | 12/2005 | Baumberg ................. 382/154 |
| 7,006,034 | B1 | 2/2006 | Krikorian et al. |
| 7,035,456 | B2 | 4/2006 | Lestideau |
| 7,362,378 | B2 | 4/2008 | Orlick |
| 7,830,300 | B2 | 11/2010 | Bruyere et al. |
| 8,054,217 | B2 | 11/2011 | Gruyere et al. |
| 2006/0147090 | A1 | 7/2006 | Yang |
| 2010/0283667 | A1 | 11/2010 | Bruyere et al. |
| 2010/0283668 | A1 | 11/2010 | Bruyere et al. |

FOREIGN PATENT DOCUMENTS

| | | |
|---|---|---|
| WO | WO-01014907 A1 | 3/2001 |

OTHER PUBLICATIONS

"U.S. Appl. No. 11/957,393, Final Office Action mailed Apr. 19, 2011", 6 pgs.

"U.S. Appl. No. 11/975,392, Final Office Action mailed Apr. 12, 2011", 5 pgs.

"U.S. Appl. No. 11/975,392, Non Final Office Action mailed Jul. 19, 2011", 8 pgs.

"U.S. Appl. No. 11/975,392, Non Final Office Action mailed Nov. 8, 2010", 10 pgs.

"U.S. Appl. No. 11/975,392, Response filed Feb. 3, 2011 to Non Final Office Action mailed Nov. 8, 2010", 7 pgs.

"U.S. Appl. No. 11/975,392, Response filed Jul. 6, 2011 to Final Office Action mailed Apr. 12, 2011", 6 pgs.

"U.S. Appl. No. 11/975,393, Non Final Office Action mailed Nov. 8, 2010", 8 pgs.

"U.S. Appl. No. 11/975,393, Notice of Allowance mailed Jul. 29, 2011", 7 pgs.

"U.S. Appl. No. 11/975,393, Response filed Feb. 3, 2011 to Non Final Office Action mailed Nov. 8, 2010", 8 pgs.

"U.S. Appl. No. 11/975,393, Response filed Jun. 13, 2011 to Advisory Action mailed Jun. 9, 2011 and Final Office Action mailed Apr. 19, 2011", 6 pgs.

"U.S. Appl. No. 11/975,393, Response filed May 26, 2011 to Final Office Action mailed Apr. 19, 2011", 6 pgs.

"U.S. Appl. No. 11/975,393, Response filed Jul. 12, 2011 to Advisory Action mailed Jul. 8, 2011", 4 pgs.

"U.S. Appl. No. 11/975,393, Advisory Action mailed Jun. 9, 2011", 3 pgs.

"European Application Serial No. 07254239.2, Examination Notification mailed Apr. 15, 2011", 5 pgs.

"European Application Serial No. 07254239.2, Office Action mailed Apr. 15, 2011", 6 pgs.

Novak, L M, et al., "An efficient multi-target SAR ATR Algorithm", Massachusetts Institute of Technology, Lincoln Labratory, Lexington MA, (1998), 7 pgs.

Novak, L M, et al., "The Automatic target Recognition System in SAIP", Lincoln Laboratory Journal vol. 10, No. 2, (1997), 187-203.

Pham, Quoc, et al., "Multistage algorithm for detection of targets in SAR image data", Proc. SPIE, 3070, (1997), 66-75.

Sonka, M., et al., "", Image Processing, Analysis, and Machine Vision, Published PWS, (1998), 124-127, 646-660.

Stimson, G. W, "", Introduction to Airborne Radar, Scitech Pub Inc, (1998), 527-549.

Zhang, Guifu, et al., "Application of angular correlation function of clutter scattering and correlation imaging in target detection.", IEEE Transactions on Geoscience and Remote Sensing, vol. 36, Issue 5, Part 1, (Sep. 1998), 1486-1493.

"U.S. Appl. No. 11/975,392, Advisory Action mailed Feb. 17, 2012", 3 pgs.

"U.S. Appl. No. 11/975,392, Final Office Action mailed Nov. 3, 2011", 5 pgs.

"U.S. Appl. No. 11/975,392, Final Office Action Response filed Feb. 3, 2012", 6 pgs.

"U.S. Appl. No. 11/975,392, Notice of Allowance mailed Mar. 7, 2012", 7 pgs.

"U.S. Appl. No. 11/975,392, Response filed Feb. 23, 2012 to Advisory Action mailed Feb. 17, 2012", 6 pgs.

"U.S. Appl. No. 11/975,392, Response filed Oct. 4, 2011 to Non Final Office Action mailed Jul. 19, 2011", 7 pgs.

* cited by examiner

DETECTION SYSTEM AND METHOD USING GRADIENT MAGNITUDE SECOND MOMENT SPATIAL VARIANCE DETECTION

REFERENCE TO COPENDING APPLICATIONS

This application is a continuation of and claims the benefit of priority under 35 U.S.C. 120 to U.S. patent application Ser. No. 11/975,393, filed Oct. 18, 2007, now U.S. Pat. No. 8,054, 217 which claims the benefit of priority under 35 U.S.C. 119(e) to U.S. Provisional Application No. 60/854,861 filed Oct. 26, 2006 the disclosure of which is hereby incorporated by reference herein in its entirety.

In addition, co-pending patent applications entitled RADAR IMAGING SYSTEM AND METHOD USING SECOND MOMENT SPATIAL VARIANCE and RADAR IMAGING SYSTEM AND METHOD USING DIRECTIONAL GRADIENT MAGNITUDE SECOND MOMENT SPATIAL VARIANCE DETECTION, filed on Nov. 18, 2007 by D. P. Bruyere et al., Ser. No. 11/975,392, now U.S. Pat. No. 8,212,717, and Ser. No. 11/975,391, now U.S. Pat. No. 7,830, 300, involve second moment detection and directional gradient second moment detection, respectively, the teachings of which are hereby incorporated herein by reference.

BACKGROUND OF THE INVENTION

1. Field of the Invention

The present invention relates to radar systems and associated methods. More specifically, the present invention relates to systems and methods for improving radar image quality.

2. Description of the Related Art

Synthetic Aperture Radar (SAR) uses a side looking radar aperture on a moving platform to provide high-resolution imagery over a broad area. The concept usually employs airborne radar that collects data while flying some distance, and then processes the data coherently as if it came from a physically long antenna. (See Introduction to Airborne Radar by G. W. Stimson, published 1998 by Scitech Pub Inc, pp. 527-549 )

This synthetically long antenna aperture provides superior image resolution over that of the actual antenna and overcomes the weather dependent nature of all optical remote-sensing systems. While the ability of SAR radars to produce better and better imagery advances, the ability of those same radars to autonomously distinguish stationary ground vehicles from background clutter remains difficult.

Template based methods use previously collected images from known vehicles to identify targets within a scene. (See "The Automatic Target-Recognition System in SAIP", by L. M. Novak, et al., Lincoln Laboratory Journal, vol. 10, no. 2, pp 187-203, 1997 and "An efficient multi-target SAR ATR Algorithm", by L. M. Novak, et al., published by the Massachusetts Institute of Technology/Lincoln Laboratory, Lexington, Mass.)

The process of template based target identification begins with a simple localized constant false alarm rate (CFAR) detection test to remove any objects that are not locally bright, then a discrimination layer is applied that removes any non-target like objects. These two layers of processing are performed before the template processing is applied, since the template based processing can be easily overwhelmed with a high false alarm rate.

Another problem of template based target identification is that its performance is based on prior knowledge of the target. The total number of different target types that need to be identified also affects performance. One drawback of template based target detection methods is that small variations in target configurations can reduce the effectiveness of the templates.

Also, since a SAR image contains many small scatters whose physical size is on the order of the radar's wavelength, constructive and destructive interference of the complex returns produces phenomena called speckle, which reduces image quality and decreases probability of target detection. Smoothing and spatial filtering techniques can reduce speckle and help increase the probability of detection. (See "Application of angular correlation function of clutter scattering and correlation imaging in target detection", by G. Zhang, L. Tsang, *IEEE Transactions on Geoscience and Remote Sensing*, Volume 36, Issue 5, Part 1, pp. 1485-1493, September 1998.) However, these approaches remain inadequate for current more demanding applications.

Hence, a need remains in the art for an improved radar system or method for imaging a target that addresses problems associated with speckle.

SUMMARY OF THE INVENTION

The need in the art is addressed by the detection system and method of the present invention. The inventive detection system includes means for receiving a frame of image data; means for performing a rate of change of variance calculation with respect to at least one pixel in the frame of image data; and means for comparing the calculated rate of change of variance with a predetermined threshold to provide output data. In the illustrative embodiment, the frame of image data includes a range/Doppler matrix of N down range samples and M cross range samples. In this embodiment, the means for performing a rate of change of variance calculation includes means for calculating a rate of change of variance over an N×M window within the range/Doppler matrix. The means for performing a rate of change of variance calculation includes means for identifying a change in a standard deviation of a small, localized sampling of cells. The means for performing a rate of change of variance calculation outputs a rate of change of variance pixel map.

DESCRIPTION OF THE INVENTION

Illustrative embodiments and exemplary applications will now be described with reference to the accompanying drawings to disclose the advantageous teachings of the present invention.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

The present invention exploits a recognition that for complex targets viewed from airborne radar, a high degree of scene variance can provide better detection of a fluctuating target than amplitude based detection methods. This alternative method of distinguishing targets from background is presented that can be used instead of, or in conjunction with the template based processing techniques previously discussed.

Most scene based detection methods use amplitude as a means of identifying a target within the scene. Man-made targets generally have a high radar cross-section (RCS) that can make them brighter than the surrounding clutter. Factors that contribute to RCS include the physical size of target, the number of reflective surfaces, angles of the reflective surfaces, and the reflective properties of the material from which the target is made. However, even if a target has a large RCS, there is no guarantee that reflective characteristics alone will distinguish the target from other bright objects within the scene. Some natural backgrounds, such as snow that has been partially melted and refrozen, are highly reflective and can generate large radar returns that easily overshadow the returns from most man-made target types. SAR images of man-made targets have inherent characteristics that can be exploited to enhance detection of these targets. The multi-facetted, sometimes specular surfaces that land or air vehicles have, as do some buildings, help to distinguish them from normal background features such as grassy fields, roads, and trees.

Most man-made vehicles are made up of many small dihedral corner reflectors. The constructive and destructive nature of these target returns manifests itself in a SAR image as a high variation of signal amplitudes within a very localized area. This invention exploits the fact that these highly reflective, multifaceted features build constructively and fade in localized regions within the scene. These rapidly changing returns manifest themselves as a high degree of local scene variance, which can be measured by calculating the variance of a small group of pixels within a SAR scene. By using local scene variance as a distinguishing factor, enhanced detection of these target types over a variety of background types and conditions may be achieved. The associated image created from the localized variance calculations is referred to as either a variance or standard deviation image.

The present invention exploits inherent characteristics associated with most target types to improve detection within SAR images. The present invention involves second moment detection. Copending patent applications entitled RADAR IMAGING SYSTEM AND METHOD USING SECOND MOMENT SPATIAL VARIANCE and RADAR IMAGING SYSTEM AND METHOD USING DIRECTIONAL GRADIENT MAGNITUDE SECOND MOMENT SPATIAL VARIANCE DETECTION, filed Nov. 18, 2007 by D. P. Bruyere et al., Ser. No. 11/975,392 now U.S. Pat. No. 8,212,717, and Ser. No. 11/975,391, now U.S. Pat. No. 7,830,300, involve second moment detection and directional gradient second moment detection, respectively, the teachings of which are hereby incorporated herein by reference.

The invention operates on complex SAR images, where each pixel represents the signal amplitude received at a particular down range and cross range location relative to the aircraft. Nonetheless, those of ordinary skill in the art will appreciate that the present invention is not limited thereto. The present teachings may be applied to images generated by other means without departing from the scope thereof.

In accordance with the present teachings, a second moment image is derived from the input (e.g. SAR) image and a derivative image is created with respect to the second moment image. As discussed more fully below, each pixel of the second moment image represents the local standard deviation of pixel amplitudes from a small region in the original SAR image. A bright pixel in the second moment image represents an area with a high degree of local scene variance within the original scene. Alternatively, dark pixels represent a very low degree of local variance.

Second Moment Generalized Likelihood Ratio Test

To develop a generalized likelihood ratio test, assume that the distribution of the scene data is complex Gaussian whether there is a target present or not. The mean and standard deviations of the respective distributions are unknown and assumed to be different under each hypothesis. By collecting a small sample of range Doppler cells about the cell under test, we assume that we can determine whether the statistics implied by the sample cells indicate that the samples are from target cells or background cells. This controls the size of the sample that we select, since it has to be smaller than the target of interest.

The likelihood ratio test thus begins with a small matrix of pixels, X, that is made up of N down range samples by M cross range samples. This presumes a square sample area for convenience of the derivation. We will assume measurements to be independent from one pixel to the next, so the joint probability distribution under the target present is the product of the probability density functions (pdPs) associated with each individual measurement. For a small region of SAR pixels under test the target present and target absent hypothesis probability distributions are:

$$p(X; \theta_1 / H_1) = \prod_{n=-N/2}^{N/2} \prod_{m=-M/2}^{M/2} \frac{1}{(\pi\sigma_{H1}^2)} e^{\left(\frac{-(x[n,m]-A_1)^H(x[n,m]-A_1)}{\sigma_{H1}^2}\right)} = \tag{0.1}$$

$$\frac{1}{(\pi\sigma_{H1}^2)^{NM}} \exp\left(\frac{-\sum_{n=-N/2}^{N/2}\sum_{m=-M/2}^{M/2}(x[n,m]-A_1)^H(x[n,m]-A_1)}{\sigma_{H1}^2}\right)$$

and $$p(X; \theta_0 / H_0) = \prod_{n=-N/2}^{N/2} \prod_{m=-M/2}^{M/2} \frac{1}{(\pi\sigma_{H0}^2)} e^{\left(\frac{-(x[n,m]-A_0)^H(x[n,m]-A_0)}{\sigma_{H0}^2}\right)} = \tag{0.2}$$

$$\frac{1}{(\pi\sigma_{H0}^2)^{NM}} \exp\left(\frac{-\sum_{n=-N/2}^{N/2}\sum_{m=-M/2}^{M/2}(x[n,m]-A_0)^H(x[n,m]-A_0)}{\sigma_{H0}^2}\right)$$

respectively, where x[n,m] is an individual pixel that is located at n down range and in cross range. The probability distribution functions are parameterized by unknown variables $$\theta_1 \Rightarrow \begin{bmatrix} A_1 \\ \sigma_{H1}^2 \end{bmatrix} \tag{0.3}$$

-continued
$$\theta_0 \Rightarrow \begin{bmatrix} A_0 \\ \sigma_{H0}^2 \end{bmatrix}$$

where $A_1$ and $\sigma_{H1}$ are the mean and the standard deviation of the target present hypothesis, and $A_0$ and $\sigma_{H0}$ are the mean and the standard deviation of the target present hypothesis. Given this, the likelihood ratio test begins as:

$$\Lambda = \frac{p(X; \theta_1 / H_1)}{p(X; \theta_0 / H_0)} = \frac{\frac{1}{(\pi\sigma_{H1}^2)^{NM}} \exp\left(-\frac{\sum_{n=-N/2}^{N/2} \sum_{m=-M/2}^{M/2} (x[n,m] - A_1)^H (x[n,m] - A_1)}{\sigma_{H1}^2}\right)}{\frac{1}{(\pi\sigma_{H0}^2)^{NM}} \exp\left(-\frac{\sum_{n=-N/2}^{N/2} \sum_{m=-M/2}^{M/2} (x[n,m] - A_0)^H (x[n,m] - A_0)}{\sigma_{H0}^2}\right)} \begin{array}{l} > Threshold \rightarrow H1 \\ < Threshold \rightarrow H0 \end{array}$$

In order to solve for the unknown means and standard deviations, we must maximize the target present hypothesis (0.1) with respect to the unknowns in (0.3). We start by maximizing the expression with respect to the unknown amplitude: $A_1$. Taking the natural log of both sides of the equation, we get an expression that is easier to work with:

$$\ln[p(X; \theta_1 / H_1)] = \tag{0.5}$$
$$\ln\left(\frac{1}{(\pi\sigma_{H1}^2)^{NM}}\right) - \frac{\sum_{n=-N/2}^{N/2} \sum_{m=-M/2}^{M/2} (x[n,m] - A_1)^H (x[n,m] - A_1)}{\sigma_{H1}^2}.$$

Taking the derivative of (0.5) with respect to $A_1$ gives us:

$$\frac{\partial \ln[p(X; \theta_1 / H_1)]}{\partial A_1} = \frac{\partial}{\partial A_1}\left[\ln\left(\frac{1}{(\pi\sigma_{H1}^2)^{NM}}\right) - \frac{\sum_{n=-N/2}^{N/2} \sum_{m=-M/2}^{M/2} (x[n,m] - A_1)^H (x[n,m] - A_1)}{\sigma_{H1}^2}\right] = \tag{0.6}$$
$$2\frac{\sum_{n=-N/2}^{N/2} \sum_{m=-M/2}^{M/2} (x[n,m] - A_1)}{\sigma_{H1}^2}.$$

Setting this expression equal to zero and solving for the unknown mean value for the target present hypothesis gives us the maximum likelihood estimate (MLE):

$$\hat{A}_1 = \frac{1}{NM} \sum_{n=-N/2}^{N/2} \sum_{m=-M/2}^{M/2} (x[n,m]) \tag{0.7}$$

We can take a similar approach to obtain a maximum likelihood estimate of the unknown standard deviation. Taking the derivative of the log with respect to $\sigma_{H1}^2$ gives us the following expression:

$$\frac{\partial \ln[p(X; \theta_1 / H_1)]}{\partial \sigma_{H1}^2} = \frac{\partial}{\partial \sigma_{H1}^2}\left[\ln\left(\frac{1}{(\pi\sigma_{H1}^2)^{NM}}\right) - \frac{\sum_{n=-N/2}^{N/2} \sum_{m=-M/2}^{M/2} (x[n,m] - A_1)^H (x[n,m] - A_1)}{\sigma_{H1}^2}\right] = \tag{0.8}$$
$$-\frac{NM}{(\sigma_{H1}^2)} + \frac{\sum_{n=-N/2}^{N/2} \sum_{m=-M/2}^{M/2} (x[n,m] - A_1)^H (x[n,m] - A_1)}{\sigma_{H1}^4}.$$

Since we have concluded that $\hat{A}_1$ is the MLE for the unknown target present hypothesis mean, we can substitute it in for $A_1$ and set the expression equal to zero to solve for the unknown variance term:

$$\hat{\sigma}_{H1}^2 = \frac{1}{NM} \sum_{n=-N/2}^{N/2} \sum_{m=-M/2}^{M/2} (x[n,m] - \hat{A}_1)^H (x[n,m] - \hat{A}_1). \tag{0.9}$$

Understanding that we have similar unknowns under the target absent hypothesis, represented in (0.3), we can proceed in a similar manner to find their respective MLE's starting with the $H_0$ probability density function in (0.2) and get similar results for the target absent hypothesis:

$$\hat{A}_0 = \frac{1}{NM} \sum_{n=-N/2}^{N/2} \sum_{m=-M/2}^{M/2} (x[n,m]) \tag{0.10}$$

$$\hat{\sigma}_{H0}^2 = \frac{1}{NM} \sum_{n=-N/2}^{N/2} \sum_{m=-M/2}^{M/2} (x[n,m] - \hat{A}_0)^H (x[n,m] - \hat{A}_0)$$

Substituting all of the maximum likelihood estimates in for their unknown counterparts and simplifying, we get an expression for the generalized likelihood ratio test for a synthetic aperture scene:

$$GLRT = \frac{p(X; \theta_1/H_1)}{p(X; \theta_0/H_0)} = \quad (0.11)$$

$$\frac{\dfrac{1}{(2\pi\hat{\sigma}_{H1}^2)^{\frac{NM}{2}}} \exp\left(-\dfrac{\sum_{n=-N/2}^{N/2}\sum_{m=-M/2}^{M/2}(x[n,m]-\hat{A}_1)^H(x[n,m]-\hat{A}_1)}{2\hat{\sigma}_{H1}^2}\right)}{\dfrac{1}{(2\pi\hat{\sigma}_{H0}^2)^{\frac{NM}{2}}} \exp\left(-\dfrac{\sum_{n=-N/2}^{N/2}\sum_{m=-M/2}^{M/2}(x[n,m]-\hat{A}_0)^H(x[n,m]-\hat{A}_0)}{2\hat{\sigma}_{H0}^2}\right)}$$

$$GLRT = \frac{\dfrac{1}{(2\pi\hat{\sigma}_{H1}^2)^{\frac{NM}{2}}}}{\dfrac{1}{(2\pi\hat{\sigma}_{H0}^2)^{\frac{NM}{2}}}} = \frac{(2\pi\hat{\sigma}_{H0}^2)^{\frac{NM}{2}}}{(2\pi\hat{\sigma}_{H1}^2)^{\frac{NM}{2}}} = \left(\frac{\hat{\sigma}_{H0}^2}{\hat{\sigma}_{H1}^2}\right)^{\frac{NM}{2}}.$$

The most significant factor of the resultant expression indicates that we can set a threshold that depends strictly on the variance of the local statistics, regardless of the mean value of the local statistics. Therefore, as disclosed and claimed in copending U.S. Pat. No. 8,212,717, entitled RADAR IMAGING SYSTEM AND METHOD USING SECOND MOMENT SPATIAL VARIANCE, filed Nov. 18, 2007 by D. P. Bruyere et at., the second moment detector looks for a change in standard deviation of a small, localized sampling of cells. This assumes that the target image has different second order statistics than the background, but places no constraint on the overall amplitude of the target with respect to the background. Implied in this assumption is the fact that the size of the sample window needs to be smaller than the anticipated size of the target within the scene, but large enough to get a relative feel for the local second order statistical properties. If the size of the sample area is too small, then the sampled statistics are not representative of the actual second order properties associated with the area under test.

However, if the size of the sample area is too large, then the sample may be overlapping several parts of the scene with the resultant sample statistics not representing any one part of the scene, but instead, combining sample statistics from different details within the scene. It is for this reason that sufficient SAR resolution must be available to choose a sample area large enough to get a reasonable feel for the local statistics, but smaller than the smallest target size of interest.

Figure 1:
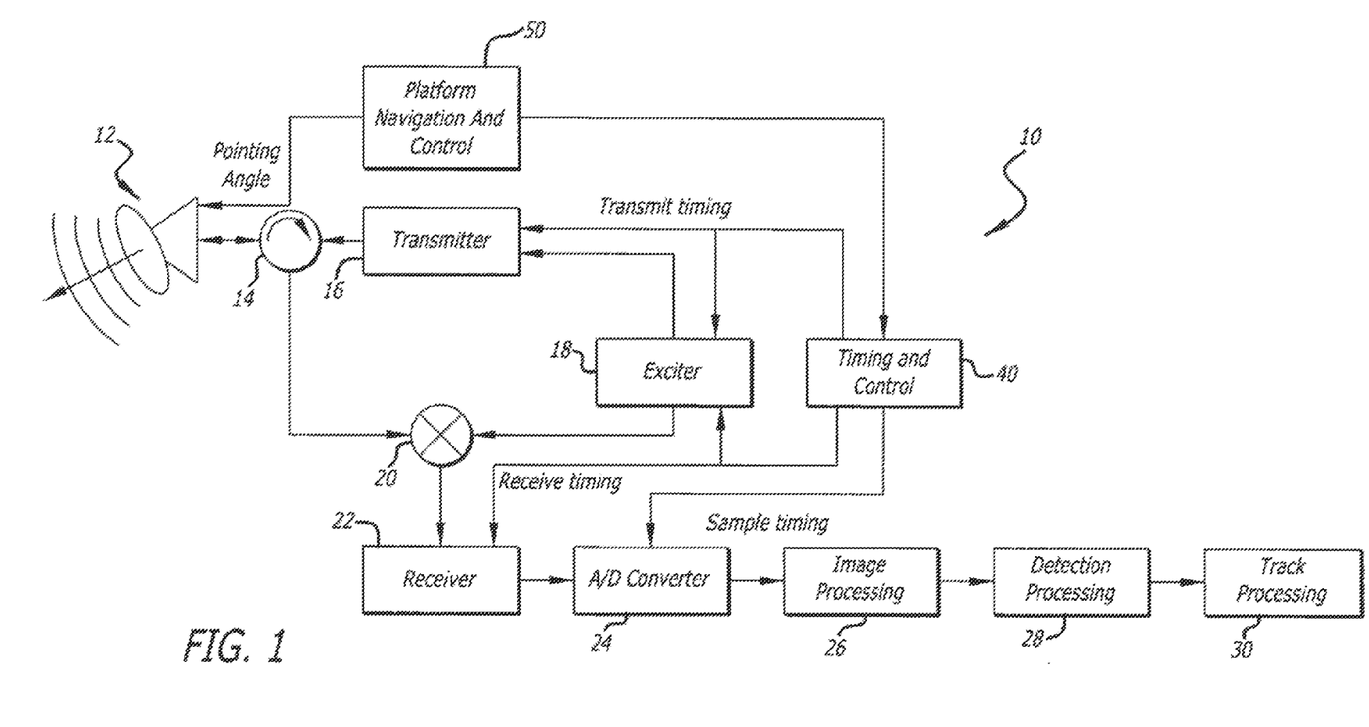
FIG. 1 is a block diagram of an illustrative embodiment of an imaging radar system implemented in accordance with the present teachings.

FIG. 1 is a block diagram of an illustrative embodiment of an imaging radar system implemented in accordance with the present teachings. As shown in FIG. 1, the system 10 includes a SAR antenna 12 coupled to a circulator 14. As is common in the art, the circulator 14 couples energy to the antenna 12 from a transmitter 16 in response to an exciter 18. The circulator 14 also couples energy from the antenna 12 to a receiver 22 via a multiplexer 20. The receiver 22 down converts the received SAR signals and provides a baseband output to an analog to digital converter 24. The A/D converter 24 outputs digital data to image processing, detection processing and track processing modules 26, 28 and 30 respectively. In the best mode, the modules 26, 28 and 30 are implemented in software. Transmit, receive and AID timing and system control is provided by a conventional clock and control processor 40 in response to signals from a platform navigation and control system 50. The platform navigation and control system 50 also provides pointing angle control to the antenna 12 as is common in the art.

As discussed more fully below, the present invention is implemented within the detection-processing module 28 of FIG. 1. Detection processing is illustrated in the flow diagram of FIG. 2.

Figure 2:
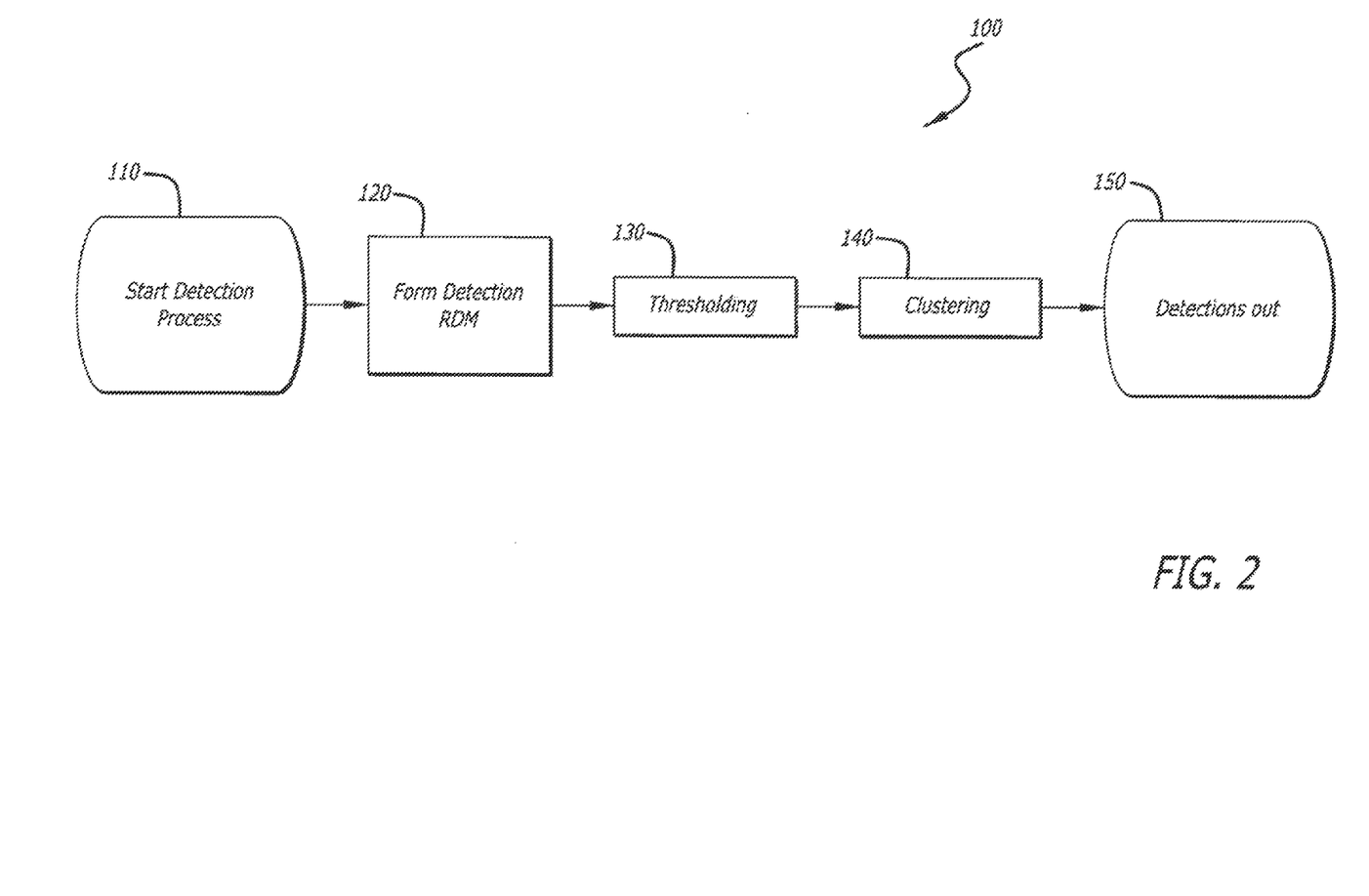
FIG. 2 is a flow diagram of an illustrative embodiment of a method for detection processing in accordance with the present teachings.

FIG. 2 is a flow diagram of an illustrative embodiment of a method for detection processing in accordance with the present teachings. As illustrated in FIG. 2, the illustrative method 100 begins with an initiation step 110 after which at step 120 a detection Range/Doppler Matrix (RDM) is formed. At step 130 the RDM is thresholded and at step 140 the thresholded RDMs are clustered. Finally, at step 150, the detected spatial variances are output.

Gradient Magnitude Second Moment Detection

Figure 3:
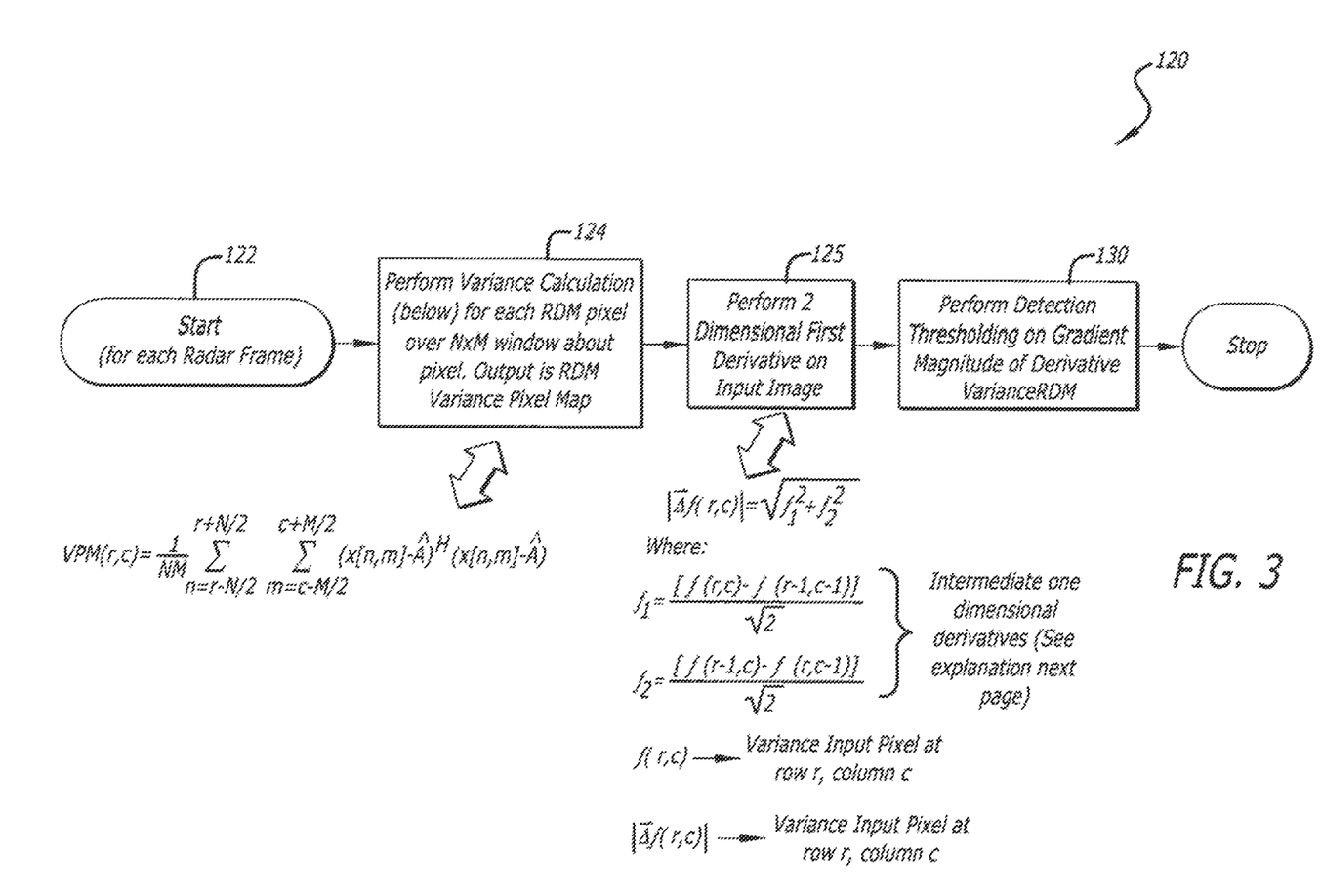
FIG. 3 is a flow diagram of an illustrative embodiment of a method for gradient magnitude second moment detection processing in accordance with the teachings of the present invention.

FIG. 3 is a flow diagram of an illustrative embodiment of a method for gradient magnitude second moment detection processing in accordance with the. teachings of the present invention. The method 120 includes an initiation step 122 for each frame of radar image data. Next, at step 124, a variance is calculated for each range-doppler matrix (RDM) pixel over an RDM matrix. The RDM matrix is a two dimensional m×n array of received radar returns indexed by range in one dimension and Doppler in the other dimension, where in and n are integers indicating the size of a window used to calculate localized variance within a scene.

In accordance with the present teachings, at step 125, a two-dimensional derivative of variance (i.e., the standard deviation in intensity) is taken to realize a more sensitive detector by looking for a high rate of change in variance. In the preferred embodiment, the technique used to calculate the two dimensional derivative implements a Roberts method. See Image Processing, *Analysis, and Machine Vision*, by M. Sonka, V. Hlavac, and R. Boyle, PWS Publishing, (1999). Nonetheless, those of ordinary skill in the art will appreciate that other techniques for calculating a high rate of change of variance may be used without departing from the scope of the present teachings.

Figure 4:
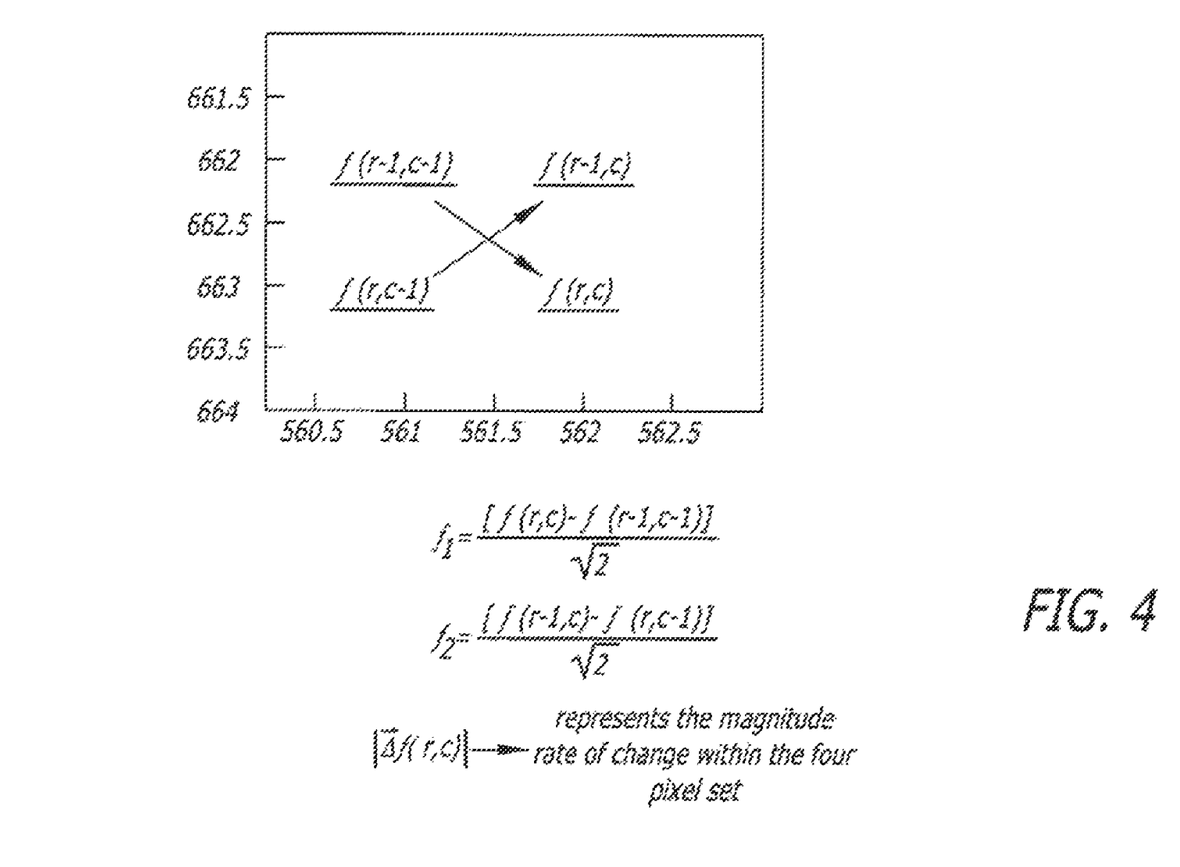
FIG. 4 is a diagram that illustrates the Roberts operation for taking a two-dimensional derivative of variance in accordance with an illustrative embodiment of the present teachings.

To use the Roberts method of calculating the two-dimensional derivative, one calculates the intensity difference across the diagonals of four image pixels for all contiguous sets of four within the image, as illustrated in FIG. 4.

FIG. 4 is a diagram that illustrates the Roberts operation for taking a two-dimensional derivative of variance in accordance with an illustrative embodiment of the present teachings. These intensity differences are normalized by a square root of two, to account for the fact that the difference is being taken across the diagonal, then the square root of the sum of the squares of the two diagonal derivatives provides the gradient magnitude of the four pixel area centered in the middle of the four pixel set. This is expressed as $$f_1 = \frac{[f(r, c) - f(r-1, c-1)]}{\sqrt{2}} \quad (0.12)$$

$$f_2 = \frac{[f(r-1, c) - f(r, c-1)]}{\sqrt{2}}$$

-continued $$|\Delta \bar{f}| = \sqrt{f_1^2 + f_2^2}$$

where |Δf̄| is the gradient magnitude and $f_1$ and $f_2$ are the intermediate diagonal derivatives. The advantage of the Roberts derivative operator is the fact that only four pixel elements are required and the calculated gradient is centered in the middle of the four pixels used in the calculation.

The reason that we chose to analyze the gradient magnitude of the second moment image is that it should have some advantages over the second moment image itself. Some naturally occurring image phenomenology exists that might trigger an absolute measure of variance, such as the intensity of the antenna beam pattern reflecting off of a field of grass. The variance in the center of the beam would be higher than the sides of the beam, yet we would not want to consider the center of the beam pattern in a uniform field of grass as a legitimate threshold crossing. Since the rate of change of increased variance associated with the beam pattern intensity would be slower than the rate of change of variance from man made target, then this may prove to be a better detector under certain circumstances. This should reduce the number of false alarms due to beam pattern roll off, or other naturally occurring phenomena such as reflectivity changes associated with grassy fields.

The invention capitalizes on the fact that target returns second order statistics change faster than second order statistic of background clutter due to rapid changes in target reflectivity.

Figure 5:
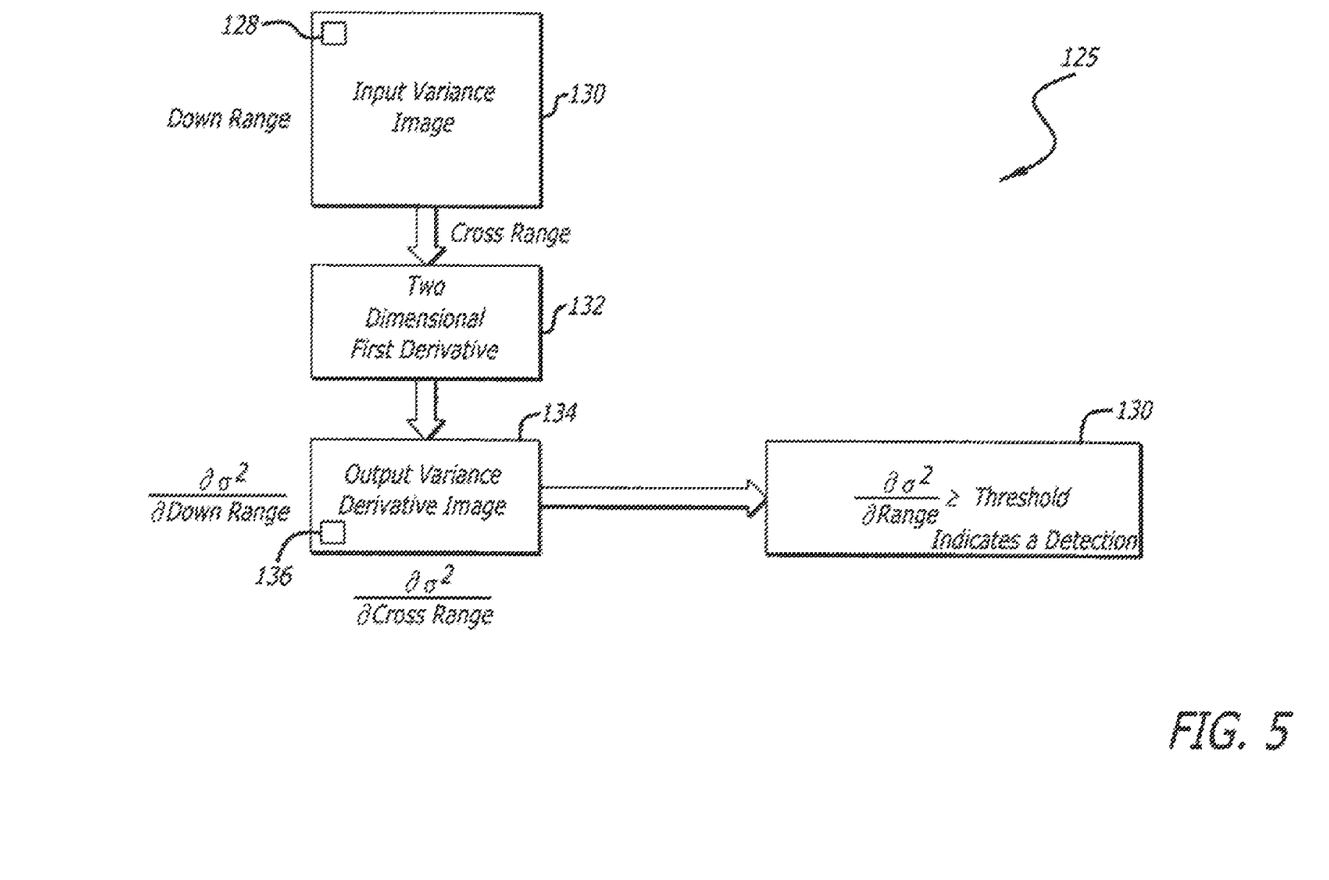
FIG. 5 is a flow diagram in more detail of an illustrative embodiment of a method for gradient magnitude second moment detection processing in accordance with the teachings of the present invention.

FIG. 5 is a flow diagram in more detail of an illustrative embodiment of a method for gradient magnitude second moment detection processing in accordance with the teachings of the present invention. As shown in FIG. 5, each input image 130 is comprised of a plurality of pixel elements 128, each of which represents variance of scene amplitude cross range and down range. At step 132 the two dimensional first derivative is taken. At step 134, an output variance derivative image is created with respect to the variance ($\sigma^2$) in the cross range and down range directions. Each element 136 in the output variance derivative image 134 represents a rate of change of variance at the designated cross range and down range coordinates.

Each element 136 in the derivative image 134 is then compared to a threshold at step 130 to provide an output detection signal.

Returning to FIG. 3, at step 130, detection thresholding is performed on the variance/RDM. At step 130, the algorithm outputs a set of two-dimensional vectors pointing to those RDM locations that had a rate of change of variance larger than the predetermined threshold.

Thus, the present invention has been described herein with reference to a particular embodiment for a particular application. Those having ordinary skill in the art and access to the present teachings will recognize additional modifications applications and embodiments within the scope thereof.

It is therefore intended by the appended claims to cover any and all such applications, modifications and embodiments within the scope of the present invention.

Accordingly,

What is claimed is:

1. A detection system comprising a detection processor configured to:
receive a frame of radar image data that includes a range/Doppler matrix;
perform a rate-of-change of variance calculation with respect to at least one pixel in the frame of radar image data; and
compare the calculated rate-of-change of variance with a predetermined threshold to provide output data.

2. The detection system of claim 1 wherein the range/Doppler matrix includes N down-range samples and M cross-range samples.

3. The detection system of claim 1 wherein the detection processor is configured to calculate a rate-of-change of variance over an N×M window within the range/Doppler matrix.

4. The detection system of claim 3 wherein the detection processor is configured to output a rate-of-change of variance pixel map.

5. A detection system comprising a detection processor configured to:
receive a frame of radar image data;
perform a rate-of-change of variance calculation with respect to at least one pixel in the frame of radar image data;
compare the calculated rate-of-change of variance with a predetermined threshold to provide output data; and
identify a change in a standard deviation of a small, localized sampling of cells.

6. A detection method performed by a detection system comprising a detection processor, the method comprising:
receiving a frame of radar image data that includes a range/Doppler matrix;
performing a rate-of-change of variance calculation with respect to at least one pixel in the frame of radar image data; and
comparing the calculated rate-of-change of variance with a predetermined threshold to provide output data.

7. A system comprising:
a receiver;
an image processor coupled to the receiver; and
a detection processor coupled to the image processor, the detection processor having:
software for receiving a frame of radar image data;
software for performing a rate-of-change of variance calculation with respect to at least one pixel in the frame of radar image data; and
software for comparing the calculated rate-of-change of variance with a predetermined threshold to provide output data.

8. The system of claim 7 wherein the frame of radar image data includes a range/Doppler matrix.

9. The system of claim 8 wherein the range/Doppler matrix includes N down range samples and M cross range samples.

10. The system of claim 8 wherein the software for performing a rate-of-change of variance calculation includes software for calculating a rate-of-change of variance over an N×M window within the range/Doppler matrix.

11. The system of claim 10 wherein the software for performing a rate-of-change of variance calculation outputs a rate-of-change of variance pixel map.

12. The system of claim 7 wherein the software for performing a rate-of-change of variance calculation includes software for identifying a change in a standard deviation of a small, localized sampling of cells.

* * * * *

UNITED STATES PATENT AND TRADEMARK OFFICE
CERTIFICATE OF CORRECTION

PATENT NO. : 8,339,306 B2
APPLICATION NO. : 13/288009
DATED : December 25, 2012
INVENTOR(S) : Bruyere et al.

Page 1 of 2

It is certified that error appears in the above-identified patent and that said Letters Patent is hereby corrected as shown below:

On the Title Page, Item (56)

On page 2, in column 2, under "Other Publications", line 22, delete "L M," and insert --L.M.,--, therefor On page 2, in column 2, under "Other Publications", line 23, delete "Labratory" and insert --Laboratory--, therefor On page 2, in column 2, under "Other Publications", line 25, delete "L M," and insert --L.M.,--, therefor On page 2, in column 2, under "Other Publications", line 26, after "Journal", insert --,--, therefor On page 2, in column 2, under "Other Publications", line 28, before "3070", insert --vol.--, therefor On page 2, in column 2, under "Other Publications", line 29, delete """, Image" and insert --"Image--, therefor

On page 2, in column 2, under "Other Publications", line 30, after "Vision", insert --"--, therefor On page 2, in column 2, under "Other Publications", line 31, delete "W," and insert --W.,--, therefor On page 2, in column 2, under "Other Publications", line 31, delete """ , Introduction" and insert --"Introduction--, therefor On page 2, in column 2, under "Other Publications", line 31, delete "Radar," and insert --Radar,"--, therefor Signed and Sealed this
Eighteenth Day of November, 2014

Michelle K. Lee
*Deputy Director of the United States Patent and Trademark Office*

CERTIFICATE OF CORRECTION (continued)
U.S. Pat. No. 8,339,306 B2

On page 2, in column 2, under "Other Publications", line 31, delete "Inc," and insert --Inc.,--, therefor In the Drawings On Sheet 3 of 15, Fig. 31, reference numeral 130, line 4, delete "VarianceRDM" and insert --Variance/RDM--, therefor In the Specification In column 1, line 9, delete "Oct." and insert --Nov.--, therefor In column 1, line 12, after "2006", insert --,--, therefor In column 1, line 39, delete "Inc," and insert --Inc.,--, therefor In column 1, line 40, delete "527-549)" and insert --527-249.)--, therefor In column 4, line 33, delete "(pdps)" and insert --(pdfs)--, therefor In column 4, line 40 (Approx.), delete "$H_1$" and insert --H1--, therefor In column 4, line 59, delete "in" and insert --m--, therefor In column 7, line 39, delete "at.," and insert --al.,--, therefor In column 8, line 12, delete "detection-processing" and insert --detection processing--, therefor In column 8, line 26, delete "the." and insert --the--, therefor In column 8, line 29, delete "range-doppler" and insert --range/doppler--, therefor In column 8, line 32, delete "in" and insert --m--, therefor In column 9, line 5 (Approx.), delete "$|\Delta \bar{f_1}|$" and insert --$|\Delta \bar{f}|$--, therefor In column 9, line 5 (Approx.), delete "f₁" and insert --$f_1$--, therefor In column 9, line 5 (Approx.), delete "f₂" and insert --$f_2$--, therefor In column 9, line 21-22, delete "man made" and insert --man-made--, therefor In column 9, line 60, after "invention.¶", delete "Accordingly,", therefor